(12) United States Patent
He et al.

(10) Patent No.: US 9,247,239 B2
(45) Date of Patent: Jan. 26, 2016

(54) USE OF OVERLAP AREAS TO OPTIMIZE BUNDLE ADJUSTMENT

(71) Applicant: Trimble Navigation Limited, Sunnyvale, CA (US)

(72) Inventors: Shaojun He, Westminster, CO (US); Shawn Weisenburger, Denver, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 270 days.

(21) Appl. No.: 13/922,772

(22) Filed: Jun. 20, 2013

(65) Prior Publication Data

US 2014/0375773 A1    Dec. 25, 2014

(51) Int. Cl.
*H04N 13/02*    (2006.01)
*G01C 11/06*    (2006.01)

(52) U.S. Cl.
CPC ............ *H04N 13/0296* (2013.01); *G01C 11/06* (2013.01)

(58) Field of Classification Search
None
See application file for complete search history.

(56) References Cited

U.S. PATENT DOCUMENTS

| | | | |
|---|---|---|---|
| 5,077,557 A | 12/1991 | Ingensand | |
| 5,432,712 A * | 7/1995 | Chan | 382/191 |
| 5,512,905 A | 4/1996 | Nichols et al. | |
| 5,642,285 A | 6/1997 | Woo et al. | |
| 6,034,722 A | 3/2000 | Viney et al. | |
| 6,084,510 A | 7/2000 | Lemelson et al. | |
| 6,147,598 A | 11/2000 | Murphy et al. | |
| 6,237,235 B1 | 5/2001 | Kaschke et al. | |
| 6,282,362 B1 | 8/2001 | Murphy et al. | |
| 6,859,269 B2 | 2/2005 | Ohtomo et al. | |
| 6,873,407 B2 | 3/2005 | Vogel | |
| 7,374,140 B2 | 10/2006 | Crain et al. | |
| 7,145,648 B2 | 12/2006 | Vogel | |
| 7,149,366 B1 | 12/2006 | Sun | |
| 7,339,611 B2 | 3/2008 | Marold et al. | |
| 7,526,384 B2 | 4/2009 | MacIntosh et al. | |
| 7,541,974 B2 | 6/2009 | Scherzinger | |

(Continued)

FOREIGN PATENT DOCUMENTS

| | | |
|---|---|---|
| DE | 19922321 C2 | 7/2002 |
| EP | 391498 A1 | 10/1990 |

(Continued)

OTHER PUBLICATIONS

International Search Report and Written Opinion prepared by the European Patent Office as International Searching Authority for PCT International Patent Application No. PCT/US14/43271, mailed Sep. 22, 2014, 9 pages.

(Continued)

*Primary Examiner* — Jay Patel
*Assistant Examiner* — Reza Aghevli
(74) *Attorney, Agent, or Firm* — Swanson & Bratschun, L.L.C.

(57) ABSTRACT

Novel tools and techniques for defining a search range for conjugate points in a set of images. In one technique, an intra-overlap area in two images can be used to define a search range in which a conjugate point can be found; in an aspect, this search range might be expressed as a distance range from a station at which one or both of the two images were captured. That distance range can be used to narrow the search range in an image captured from another station, substantially reducing both the computation time to identify a conjugate match and the likelihood of identifying an incorrect match.

25 Claims, 8 Drawing Sheets

(56) References Cited

U.S. PATENT DOCUMENTS

| | | |
|---|---|---|
| 7,543,780 B1 | 6/2009 | Marshall et al. |
| 7,611,105 B1 | 11/2009 | Carazo |
| 7,619,561 B2 | 11/2009 | Scherzinger |
| 7,646,339 B2 | 1/2010 | Green et al. |
| 7,697,127 B2 | 4/2010 | Vogel et al. |
| 7,719,467 B2 | 5/2010 | Norda et al. |
| 7,940,211 B2 | 5/2011 | Scherzinger |
| 7,978,128 B2 | 7/2011 | Scherzinger |
| 7,991,575 B2 | 8/2011 | Vogel et al. |
| 8,024,144 B2* | 9/2011 | Kludas et al. ............... 702/85 |
| 8,125,379 B2 | 2/2012 | Allison |
| 8,229,166 B2* | 7/2012 | Teng et al. ............... 382/103 |
| 8,285,512 B2 | 10/2012 | Vogel et al. |
| 8,348,166 B2* | 1/2013 | Hanson ............... 235/462.1 |
| 8,416,130 B2* | 4/2013 | Scherzinger ............ 342/357.23 |
| 8,427,632 B1* | 4/2013 | Nash et al. ............... 356/3.1 |
| 8,625,086 B2* | 1/2014 | Vogel et al. ............ 356/141.5 |
| 8,629,905 B2* | 1/2014 | Svanholm ............... 348/135 |
| 8,633,588 B2 | 1/2014 | Lin et al. |
| 8,754,805 B2 | 6/2014 | Wang et al. |
| 8,897,482 B2* | 11/2014 | Mein et al. ............... 382/100 |
| 2002/0012071 A1 | 1/2002 | Sun |
| 2003/0137449 A1 | 7/2003 | Vashisth et al. |
| 2003/0218540 A1 | 11/2003 | Cooper et al. |
| 2004/0105090 A1* | 6/2004 | Schultz et al. ............ 356/141.5 |
| 2004/0228517 A1* | 11/2004 | Massen ............... 382/154 |
| 2005/0025313 A1 | 2/2005 | Wachtel et al. |
| 2005/0031197 A1 | 2/2005 | Knopp |
| 2005/0057745 A1 | 3/2005 | Bontje |
| 2005/0069195 A1* | 3/2005 | Uezono et al. ............... 382/154 |
| 2005/0125142 A1 | 6/2005 | Yamane |
| 2006/0017938 A1 | 1/2006 | Ohtomo et al. |
| 2006/0195254 A1 | 8/2006 | Ladetto et al. |
| 2007/0133012 A1 | 6/2007 | Euler |
| 2007/0188601 A1* | 8/2007 | Rohaly et al. ............... 348/47 |
| 2007/0247457 A1 | 10/2007 | Gustafsson et al. |
| 2007/0297696 A1 | 12/2007 | Hamza et al. |
| 2009/0074254 A1 | 3/2009 | Jamison et al. |
| 2009/0154793 A1 | 6/2009 | Shin et al. |
| 2009/0220144 A1 | 9/2009 | Mein et al. |
| 2009/0225161 A1 | 9/2009 | Otani et al. |
| 2009/0231574 A1 | 9/2009 | Vogel et al. |
| 2009/0262974 A1 | 10/2009 | Lithopoulos |
| 2010/0157283 A1 | 6/2010 | Kirk et al. |
| 2010/0168949 A1 | 7/2010 | Malecki et al. |
| 2010/0172546 A1 | 7/2010 | Sharp |
| 2010/0305857 A1 | 12/2010 | Byrne et al. |
| 2010/0309311 A1 | 12/2010 | Svanholm |
| 2010/0322482 A1 | 12/2010 | Kochi |
| 2011/0007154 A1 | 1/2011 | Vogel et al. |
| 2011/0064312 A1 | 3/2011 | Janky et al. |
| 2011/0158475 A1 | 6/2011 | Otani et al. |
| 2011/0282578 A1 | 11/2011 | Miksa et al. |
| 2011/0285587 A1 | 11/2011 | Vollath et al. |
| 2011/0290937 A1 | 12/2011 | Salkeld |
| 2012/0026322 A1 | 2/2012 | Malka et al. |
| 2012/0029732 A1 | 2/2012 | Meyer |
| 2012/0093394 A1* | 4/2012 | Li ............... 382/154 |
| 2012/0114229 A1 | 5/2012 | Zhou |
| 2012/0155747 A1* | 6/2012 | Hwang ............... 382/154 |
| 2012/0163656 A1 | 6/2012 | Wang et al. |
| 2012/0166137 A1 | 6/2012 | Grässer et al. |
| 2012/0274775 A1 | 11/2012 | Reiffel |
| 2012/0326923 A1 | 12/2012 | Oehler et al. |
| 2012/0330601 A1 | 12/2012 | Soubra et al. |
| 2013/0161810 A1 | 6/2013 | Lin et al. |
| 2013/0228645 A1 | 9/2013 | Van Speybroeck et al. |
| 2013/0253822 A1 | 9/2013 | Fortune et al. |
| 2013/0298083 A1 | 11/2013 | Bertoldo et al. |
| 2014/0019179 A1 | 1/2014 | Gosalvez et al. |
| 2014/0081571 A1 | 3/2014 | Briggs et al. |
| 2014/0091481 A1 | 4/2014 | Lin et al. |
| 2014/0146173 A1 | 5/2014 | Joyce et al. |
| 2014/0156219 A1 | 6/2014 | Soubra et al. |
| 2014/0195150 A1 | 7/2014 | Rios |
| 2014/0222246 A1 | 8/2014 | Mohamadi |
| 2015/0036888 A1 | 2/2015 | Weisenburger |
| 2015/0268043 A1 | 9/2015 | McFadden et al. |
| 2015/0276402 A1 | 10/2015 | Grasser et al. |

FOREIGN PATENT DOCUMENTS

| | | | |
|---|---|---|---|
| EP | 1944572 A1 | 7/2008 | |
| EP | 1936323 B1 | 3/2010 | |
| EP | 1931945 B1 | 4/2011 | |
| SE | WO 2009/100773 | * 8/2009 | ............. G01C 15/00 |
| WO | WO 91/19265 | 12/1991 | |
| WO | WO 2009/100728 A1 | 8/2009 | |
| WO | WO 2009/100773 A1 | 8/2009 | |
| WO | WO 2009/100774 A1 | 8/2009 | |
| WO | WO 2009/103342 A1 | 8/2009 | |
| WO | WO 2009/106141 A1 | 9/2009 | |
| WO | WO 2010/080950 A1 | 7/2010 | |
| WO | WO 2011/005783 A2 | 1/2011 | |
| WO | WO 2011/088509 | 7/2011 | |
| WO | WO 2011/131382 A1 | 10/2011 | |
| WO | WO 2012/088413 A1 | 6/2012 | |
| WO | WO 2014/055428 A2 | 4/2014 | |
| WO | WO 2014/055430 A2 | 4/2014 | |
| WO | WO 2014/081535 A1 | 5/2014 | |
| WO | WO 2014/205277 A1 | 12/2014 | |

OTHER PUBLICATIONS

Elphel, Inc. (2011) Elphel-Eyesis 4π http://www3.elphel.com/eyesis-4pi, accessed on: Feb. 29, 2012, 4 pages.

Elphel, Inc. (Nov. 12, 2011) Elphel-Eyesis 4π Brochure, www.elphel.com accessed on Feb. 29, 2012, 12 pages.

Elphel, Inc. (Mar. 10, 2010) Elphel Development Blog first Elphel Eyesis Prototype assembled, www.elphel.com accessed on Mar. 1, 2012, 7 pages.

Elphel, Inc. (2011) Imaging solutions with Free software and open hardware, www3.elphel.com accessed on Mar. 1, 2012, 2 pages.

International Preliminary Report on Patentability (IPRP) by the International Bureau for PCT International Patent Application No. PCT/US11/66839, mailed Jul. 4, 2013, 6 pages.

International Search Report and Written Opinion prepared by the U.S. Patent and Trademark Office as International Searching Authority for PCT International Patent Application No. PCT/US11/66839, mailed Mar. 12, 2012; 12 pages.

International Search Report and Written Opinion prepared by the U.S. Patent and Trademark Office as International Searching Authority for PCT International Patent Application No. PCT/US13/62674, mailed Mar. 10, 2014; 18 pages.

International Search Report and Written Opinion prepared by the U.S. Patent and Trademark Office as International Searching Authority for PCT International Patent Application No. PCT/US13/62679, mailed Mar. 28, 2014; 16 pages.

International Search Report and Written Opinion prepared by the European Patent Office as International Searching Authority for PCT International Patent Application No. PCT/US13/67115, mailed Jan. 27, 2014, 14 pages.

Nasvik, "Site Layout with Robotic Total Stations", Dec. 2003 [retrieved on Jan. 25, 2014]. Retrieved from the Internet:<URL:http://www.concreteconstruction.net/Images/Site%20Layout%20with%20Robotic%20Total%20Stations_tcm45-590322.pdf> p. 3, paragraph [0000].

Tahar et al. "UAV-Based Stereo Vision for Photogrammetric Survey in Aerial Terrain Mapping," 2011 International Computer Applications and Industrial Electronics (ICCAIE 2011), Dec. 4, 2011, pp. 443-447.

U.S. Appl. No. 13/167,733, filed Jun. 24, 2011 by Wang et al. and entitled "Method and Apparatus for Image-Based Positioning," 77 pages.

U.S. Appl. No. 13/332,648, filed Dec. 21, 2011; 104 pages.

U.S. Appl. No. 13/332,648; Notice of Publication dated Jun. 28, 2012; 1 page.

U.S. Appl. No. 13/685,375, filed Nov. 26, 2012; 42 pages.

(56) References Cited

OTHER PUBLICATIONS

U.S. Appl. No. 13/685,375; Notice of Publication dated May 29, 2014; 1 page.

International Preliminary Report on Patentability (IPRP) prepared by the International Bureau for PCT International Patent Application No. PCT/US13/67115, mailed Jun. 4, 2015; 9 pages.

International Preliminary Report on Patentability (IPRP) prepared by the International Bureau for PCT International Patent Application No. PCT/US13/62674, mailed Jun. 18, 2015; 10 pages.

International Preliminary Report on Patentability (IPRP) prepared by the International Bureau for PCT International Patent Application No. PCT/US13/62679; mailed Apr. 16, 2015; 8 pages.

U.S. Appl. No. 13/332,648; Non Final Office Action dated Dec. 5, 2014; 83 pages.

U.S. Appl. No. 13/332,648; Notice of Allowance dated Jul. 7, 2015; 44 pages.

U.S. Appl. No. 13/685,375; Non Final Office Action dated Aug. 3, 2015; 20 pages.

U.S. Appl. No. 13/685,375; Notice of Allowance dated Sep. 3, 2015; 10 pages.

\* cited by examiner

USE OF OVERLAP AREAS TO OPTIMIZE BUNDLE ADJUSTMENT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to photographic image analysis, and more particularly, to techniques for improving the efficiency of bundle adjustment in photogrammetric analysis.

BACKGROUND

Photogrammetry is a computational technique in which a plurality of images (such as stereo images) can be used to determine the location of points captured in the images relative to the position of the sensor that captured the images. To perform such analysis, however, the multiple images must first be oriented with respect to one another; such orientation defines the spatial and angular relationships between the two scenes in the captured images (or, conversely, the spatial and angular relationships between the sensors when capturing the respective images).

One technique for orienting a plurality of images (such as stereo images) is termed, "bundle adjustment," which is the technique of simultaneously refining the three-dimensional coordinates describing the scene geometry of each captured image, and/or relative orientations of the image capture system(s) that captured the images. Essentially, bundle adjustment attempts to optimize (minimize) the reprojection error between the image locations of observed and predicted image points; this error can be expressed as the sum of squares of a large number of nonlinear, real-valued functions.

Accordingly, bundle adjustment is computationally expensive, because it requires first the identification of conjugate points in the several images (i.e., grid locations in each image of the same real-world feature captured in all of the images) and then the optimization of the equations expressing the positions of those conjugate points in each image. The step of identifying these conjugate points (termed "conjugate matching") is especially compute intensive because it involves identification of similarities in groups of adjacent pixels in each of the image, which requires comparison of huge numbers of pixels in each image against one another to identify conjugate candidates, which can then be analyzed to determine whether the respective points depicted by the pixels in each image actually represent conjugate points.

Currently the methods for conjugate point matching on stereo images can be divided into two groups: area based matching and feature based matching. The methods of area based matching require very accurate initial position of conjugate candidates. The methods of feature based matching also need a general area of the potential candidates. Although the employment of epipolar geometry can reduce the search scope for correct conjugate point from two dimensions to one dimension, the one dimensional search range is still very large for large imagery data. For instance, the size of a single image from a typical camera is 2592 by 1944. Without a pre-determined search range, the method has to go through each pixel on the epipolar line on one of the images to identify a point on the other image. Therefore, to find the conjugate points from one image capture position/orientation (i.e., a "station") to another station is a tremendously processing-intensive task involving comparison along the entire epipolar line.

To alleviate this problem, one might attempt to reduce the search range (i.e., the portion of an image that is searched for conjugate matches) arbitrarily. An incorrect search range, however, results in an incorrect or failed match, while a large search range may increase the both possibility of a wrong match (due to the large number of potential conjugate candidates) as well as computation time.

Currently-known feature based methods always avoid the problem of determining the search range, and directly begin with an assumption that the area of conjugate points is known, or at least roughly known. The area based methods are usually applied in conjugate point matching on aerial or satellite images in which, the overlap between stereo images, flight height of aircraft, and general terrain configuration are available, which allows relatively inexpensive computation of the position of correct conjugate points can be accurately.

Neither of these types of methods, however, can efficiently handle conjugate matching on panoramic images taken at ground level. For example, provisional U.S. Patent App. No. 61/710,486, filed Oct. 5, 2012 by Grässer et al. and titled "Enhanced Position Measurement Systems and Methods," as well as U.S. patent application Ser. No. 13/332,648, filed Dec. 21, 2011 by Grässer et al. and titled "Enhanced Position Measurement Systems and Methods" (both of which are hereby incorporated herein by reference and which are collectively referred to herein as the "Incorporated Applications") describe position measurement systems that feature a suite of panoramic cameras that provide, in some cases, up to 360° photographic coverage around a capture point.

Unlike the targets in aerial or satellite images, which are approximately on the ground plane and have a predictable distance to the camera in the aircraft, the distance from targets in panoramic ground images, such as building facades, captured by such a ground-based position measurement system can vary according to different targets. Consequently, it is almost impossible to predict the position of the conjugate points in the stereo images. Therefore, the traditional point matching methods, area based or feature based, usually fail in conjugate point matching for such panoramic images, because the search algorithm has no clue about where to search for the correct match.

Accordingly, there is a need for more robust point matching techniques. It would be particularly helpful if such techniques could be employed in the context of panoramic stereo images.

BRIEF SUMMARY

A set of embodiments provides improved techniques for defining a search range for conjugate points in a set of images. In a particular aspect of some embodiments, an intra-overlap area in two images (e.g., stereo images, two images captured by adjacent sensors on an image capture system, etc.) can be used to define a search range in which a conjugate point can be found; in an aspect, this search range might be expressed as a distance range from a station at which the two images were captured. That distance range can be used to dramatically narrow the search range in an image captured from another station, substantially reducing both the computation time to identify a conjugate match and the likelihood of identifying an incorrect match.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a system in accordance with one set of embodiments might comprise an image capture system comprising a plurality of image sensors. In some cases, when oriented at a first station, the image capture system might be configured to capture a first image with a first image sensor having a first center of projection and/or to capture a second image with a second image sensor having a second center of projection. When oriented at a second station, the image capture system might be configured to capture a third image with one of the plurality of image sensors having a third center of projection. (The reader should note that the terms, "first," "second," etc., as used herein, are intended to distinguish between different images, stations, and the like, but are not intended to connote any particular chronological ordering unless the context clearly indicates otherwise.)

In an aspect, the system can further comprise a computer, which might comprise a processor and a non-transitory computer readable medium having a set of instructions executable by the processor to cause the computer to perform one or more operations. Merely by way of example, the set of instructions might comprise instructions to determine an intra-overlap area in the first and second images; in an aspect, the intra-overlap area might have a common field of view in the first and second images and/or might be defined by an overlap between a field of view of the first sensor and a field of view of the second sensor. In some embodiments, the set of instructions might further comprise instructions to determine an inter-overlap area in the first, second, and third images; in an aspect, the inter-overlap area can have a common field of view in the first, second, third images.

The set of instructions, then, might comprise instructions to identify a first coordinate location, in the first image, of a conjugate point captured in the intra-overlap area of the first and second images and in the inter-overlap area of the first, second, and third images. In an embodiment, the set of embodiments comprises instructions to identify a second coordinate location, in the second image, of the conjugate point. There might be further instructions to compute an estimated distance range from the first station to the first conjugate point in world frame (i.e., the distance in the real world, rather than in the image(s)); such a computation might be based at least in part on the first and second coordinate locations. In an aspect, the estimated distance range might correspond to a segment of the third image.

The set of instructions, correspondingly, might include instructions to define a search area in the third image, based at least in part on the computed estimated distance range and initial relative orientations of the image capture system at the first and second stations. (It can be noted that these initial relative orientations might be relatively imprecise—and/or subject to refinement based on bundle adjustment—but that such rough orientations can still serve to define the search area.) The computer might also be programmed with instructions to analyze the search area to identify a third coordinate location, in the third image, of the conjugate point. In an aspect, analysis of the third image can be limited to analysis of the search area, and limitation of the analysis can substantially reduce a number of pixels in the third image analyzed by the computer. In some cases, the set of instructions might further comprise instructions to perform a bundle adjustment calculation to orient the third image relative to at least one of the first and second images, based at least in part on the first, second, and third coordinate locations of the conjugate point.

A method in accordance with another set of embodiments might comprise identifying, with a computer, a first coordinate location, in a first image, of a conjugate point and/or identifying, with the computer, a second coordinate location, in a second image, of the conjugate point. The method can further include computing, with the computer, a distance range from a center of projection of at least one of the first and second images to the first conjugate point, based at least in part on the first and second coordinate locations. In some embodiments, the method comprises defining, with the computer, a search area in a third image, based on the computed distance range and relative orientations of the image capture system at the first and second stations. The method might also feature analyzing the search area, with the computer, to identify a third coordinate location, in a third image, of the conjugate point.

In some cases, the method comprises capturing the images as well. Merely by way of example, the method might comprise orienting an image capture system (which can include a plurality of image sensors, in some embodiments) at a first station, capturing the first image at the first station with a first image sensor, and/or capturing the second image at the first station with a second image sensor. The method might further include orienting the image capture system at a second station and capturing the third image at the second station with one of the plurality of image sensors. In some cases, the method might include identifying, based at least in part on the computed estimated distance range and relative orientations of the image capture system at the first and second stations, the third image from among a plurality of images captured at the second station.

A computer system in accordance with another set of embodiments might comprise one or more processors and/or a computer readable medium in communication with the one or more processors. In an aspect, the computer readable medium might have encoded thereon a set of instructions executable by the computer system to perform one or more operations, including without limitation, instructions to perform operations(s) in accordance with methods provided by other embodiments.

Merely by way of example, the set of instructions might comprise instructions to identify a first coordinate location, in a first image, of a conjugate point; instructions to identify a second coordinate location, in a second image, of the conjugate point; instructions to compute an estimated distance range from a center of projection of at least one of the first and second images to the first conjugate point, based at least in part on the first and second coordinate locations; instructions to define a search area in a third image, based on the computed estimated distance range and relative orientations of the image capture system at the first and second stations; and/or instructions to analyze the search area to identify a third coordinate location, in a third image, of the conjugate point.

An apparatus in accordance with yet another set of embodiments might further comprise a non-transitory computer readable medium having encoded thereon a set of instructions executable by one or more computers to perform one or more operations, including without limitation, instructions to perform operations(s) in accordance with methods provided by other embodiments. Merely by way of example, the set of instructions might comprise instructions to identify a first coordinate location, in a first image, of a conjugate point; instructions to identify a second coordinate location, in a second image, of the conjugate point; instructions to compute an estimated distance range from a center of projection of at least one of the first and second images to the first conjugate point, based at least in part on the first and second coordinate locations; instructions to define a search area in a third image, based on the computed estimated distance range and relative orientations of the image capture system at the first and second stations; and/or instructions to analyze the search area to identify a third coordinate location, in a third image, of the conjugate point.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
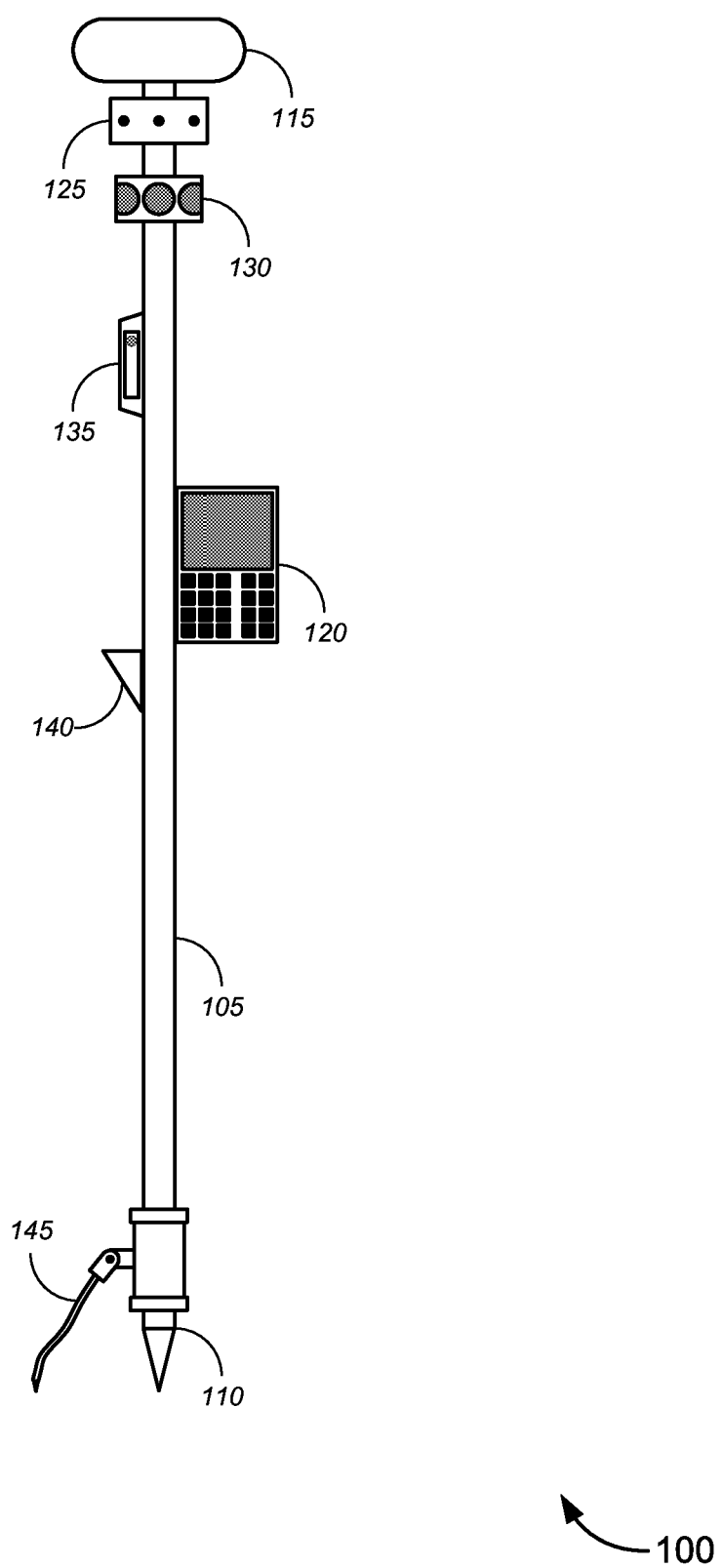
FIG. 1 is a drawing of a position measurement system, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments provides improved techniques for defining a search range for conjugate points in a set of images. In a particular aspect, some embodiments involve the use of an image capture system comprising multiple cameras, including without limitation, a device comprising a plurality of cameras that collectively can capture a panoramic image (e.g., up to 360° around the image capture system). (The term "camera" is used herein to refer to any type of camera or image capture device, including in particular digital image sensors, that can capture images for analysis in accordance with the techniques described herein.)

In such embodiments, the images captured by two (e.g., adjacent) cameras when the image capture system is at a given station will have an area of overlap, which falls within the field of view of both cameras and is captured in an image taken by each sensor. This area is referred to herein as an "intra-overlap" area. In an aspect, then, for a point selected on an image take from a first station, to determine the accurate resting area or search range of that point's conjugate point on the images from other stations, certain embodiments use the intra-overlap between panorama cameras. Some examples of image capture systems that can be used to capture suitable images with an intra-overlap area include the position measurement systems disclosed in the Incorporated Applications and described below with regard to FIGS. 1 and 2. Embodiments are not limited to such systems, however, and the techniques disclosed herein can be used with appropriate images captured by many different types of cameras and image capture systems.

Figure 4:
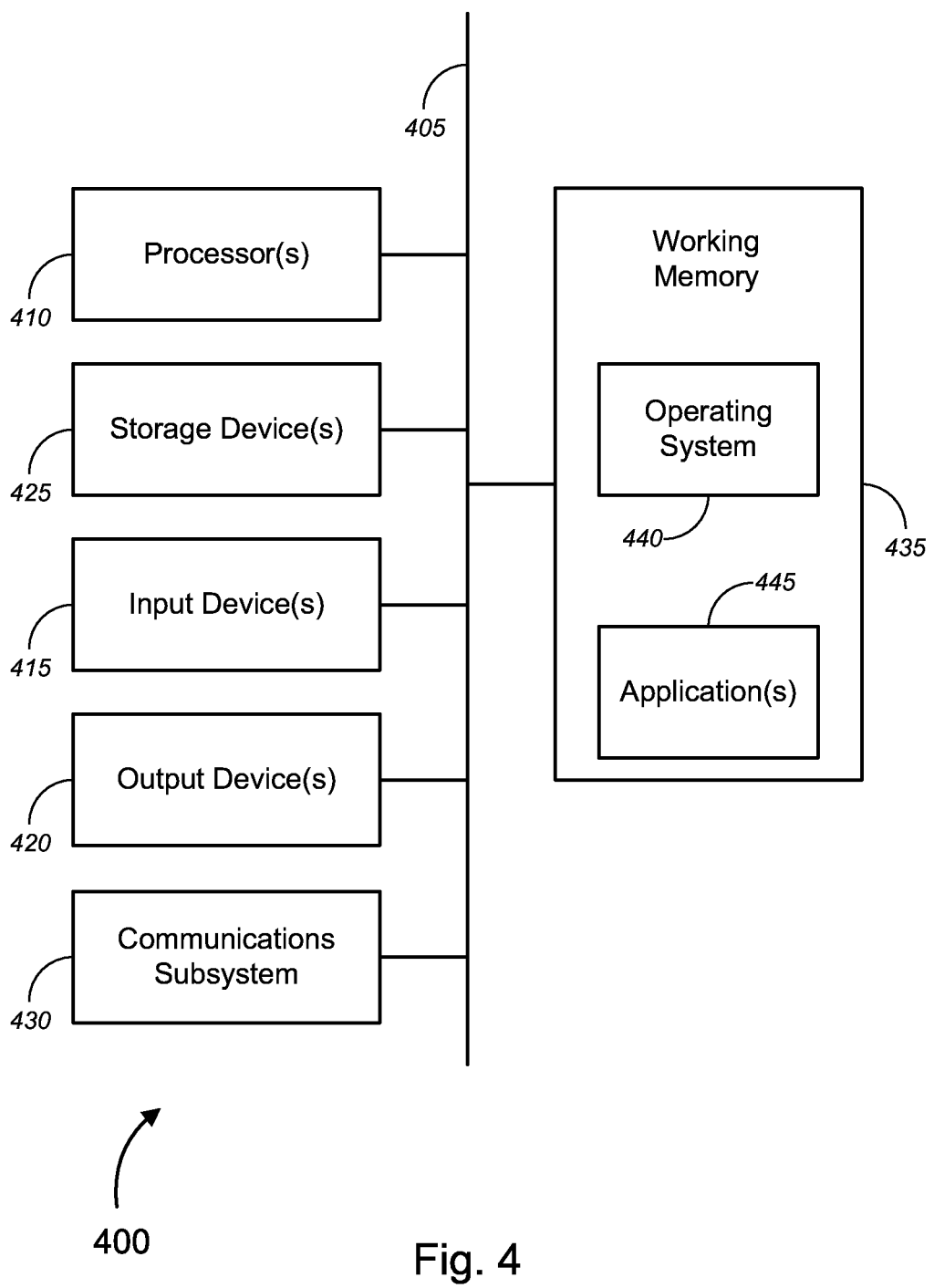
FIG. 4 is a generalized schematic diagram illustrating a computer system, in accordance with various embodiments.
Figure 5:
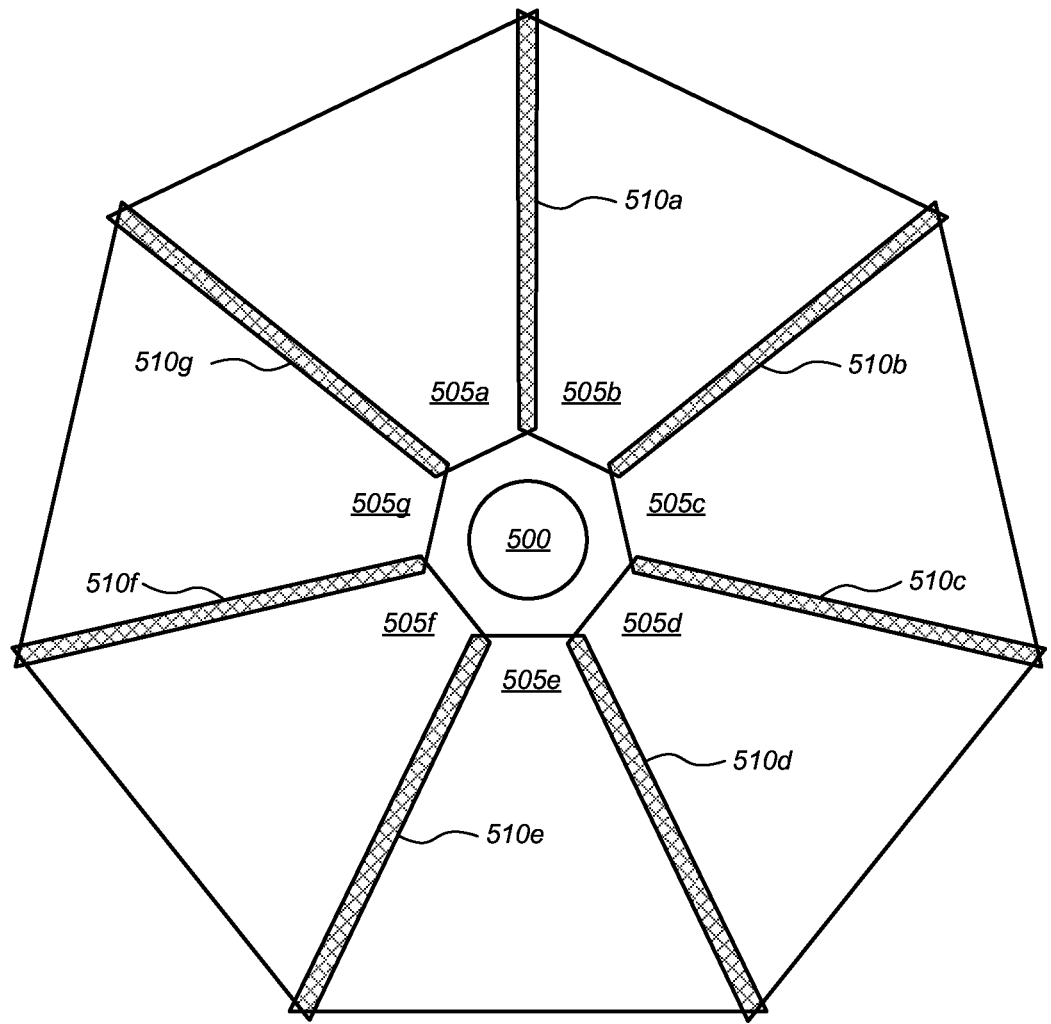
FIG. 5 illustrates a field of view of a panoramic image capture system featuring a plurality of image sensors, in accordance with various embodiments.

Merely by way of example, an exemplary image capture system might have seven panorama cameras, which collectively provide a 360° full coverage of the ground varying from 6 m from the base of the image capture system to infinity. In an aspect, these cameras are calibrated with respect to one another, which means the relative spatial translation and angular orientation between any two cameras are fixed and/or determined before any images are captured. In a particular example, the distance between the lenses of two adjacent cameras in the system is 3.6 cm, and the focal length of each lens is 3.6 mm. The resulting field of view of each camera, in this example, is 57.9 by 43.2 degrees. This geometry of the design makes each camera share about 10% of its ground coverage with its adjacent cameras. This 10% overlap is what we refer to herein as the "intra-overlap." The coverage shared by the field of views of images taken from different stations is referred to herein as an "inter-overlap" area. This concept is illustrated by FIGS. 4 and 5, discussed in further detail below.

In accordance with some embodiments, then, a target (which can be any identifiable feature, natural or manmade, including without limitation optical targets placed in the field of view before capturing the images) falling into the intra-overlap of a pair of adjacent cameras is imaged twice at one station by two adjacent cameras. These two conjugate points corresponding to the same target on two images in the intra-overlap forms an intra-stereo pair. Any suitable point matching methods (including conventional area based or feature based matching techniques), can be applied to match the conjugate points in intra-overlap since the search range is locked into the 10% intra-overlap. If a pair of conjugate points is correctly established, with the calibrated short baseline between two adjacent cameras, one can compute the distance from the target, corresponding to the conjugate points, to the image capture system.

Given the position and orientation of the image capture system (which can be obtained from RTK, conventional surveying techniques, tilt sensor and/or digital compass measurements, one can compute the position of the point in intra-overlap in world frame at any station. If a point in current station's intra-overlap is also located in the inter-overlap between other stations, the computed position at current station can be further projected to other stations. By doing so, one can accurately predict the image position of a pair of conjugate points locate the conjugate points of this point at current station in other stations.

Because the baseline between two adjacent cameras is short, and/or due to imprecision/inaccuracy in the initial orientation of the image capture device at the stations, identification of a conjugate point in the intra area overlap far away from the cameras may produce a distance range (from the station at which the images were captured), rather than an accurate position. As described in further detail below, this range of distance from the station can be used to identify (1) which of several images taken from another station should be searched for the conjugate point and/or (2) a search range in an image taken from a second station. Hence, the point matching methods have a very accurate pre-determined search range to begin with, which allows far more efficient identification of conjugate points in images taken from another station. By doing so, time used for searching is tremendously reduced, and the reliability of the matching result is increased.

Exemplary Hardware Configurations

FIG. 1 illustrates a position measurement system 100, in accordance with one set of embodiments (referred to in connection with the description of FIG. 1 as a "rover"), which can be used to capture stereo images, in accordance with a set of embodiments. It should be noted that while the rover 100 of FIG. 1 includes a combination of many different features, position measurement systems in accordance with other embodiments might omit some or all of these features. Thus, while the illustrated rover 100 is exemplary of certain embodiments, it should not be considered limiting.

The rover 100 comprises a rod 105 having a longitudinal axis, and in many embodiments, the rover 100 is designed so that, in use, the longitudinal axis of the rod 105 will be disposed in a substantially vertical position, with the base portion 110 substantially in contact with the ground. As illustrated, the base portion 110 has a generally conical or pointed shape, which can allow for precise placement of the base 110 at a desired point on the ground and which can prevent the base portion 110 from sliding on the ground, although this is not required. The rod 105 may be constructed of any suitable material, including without limitation a variety of woods, metals, plastics, and/or any suitable combination thereof. The rod 105 can be monolithic, and/or might comprise two or more separate components, which may be fixed and/or coupled together during manufacture and/or in operation. Merely by way of example, the base portion 110 of the rod 105 may be constructed of a metal, such as steel and/or an alloy, while the remainder of the rod 105 may be constructed of a different material, such as a composite.

The rover 100 further comprises several subsystems, which are illustrated functionally on FIG. 1. These functions of these subsystems may be separated or combined in any suitable fashion, and various embodiments are not limited to the architecture described herein, which should be considered only exemplary in nature. Merely by way of example, the functionality of the rover 100, in some embodiments, might be incorporated in to a single monolithic device. For ease of description, however, the exemplary embodiments discussed herein, group the functionality of the rover 100 into functional subsystems.

For example, a sensing subsystem 115, which may be permanently and/or removably coupled with (or otherwise affixed to) the rod 105. In certain embodiments, as shown, the sensing subsystem 115 sits atop the rod or is otherwise disposed on or near an end portion of the rod distal from the base portion 110. The rod 105 might include a battery compartment in the base portion 110, which can improve the balance of the rover 100.

Figure 2:
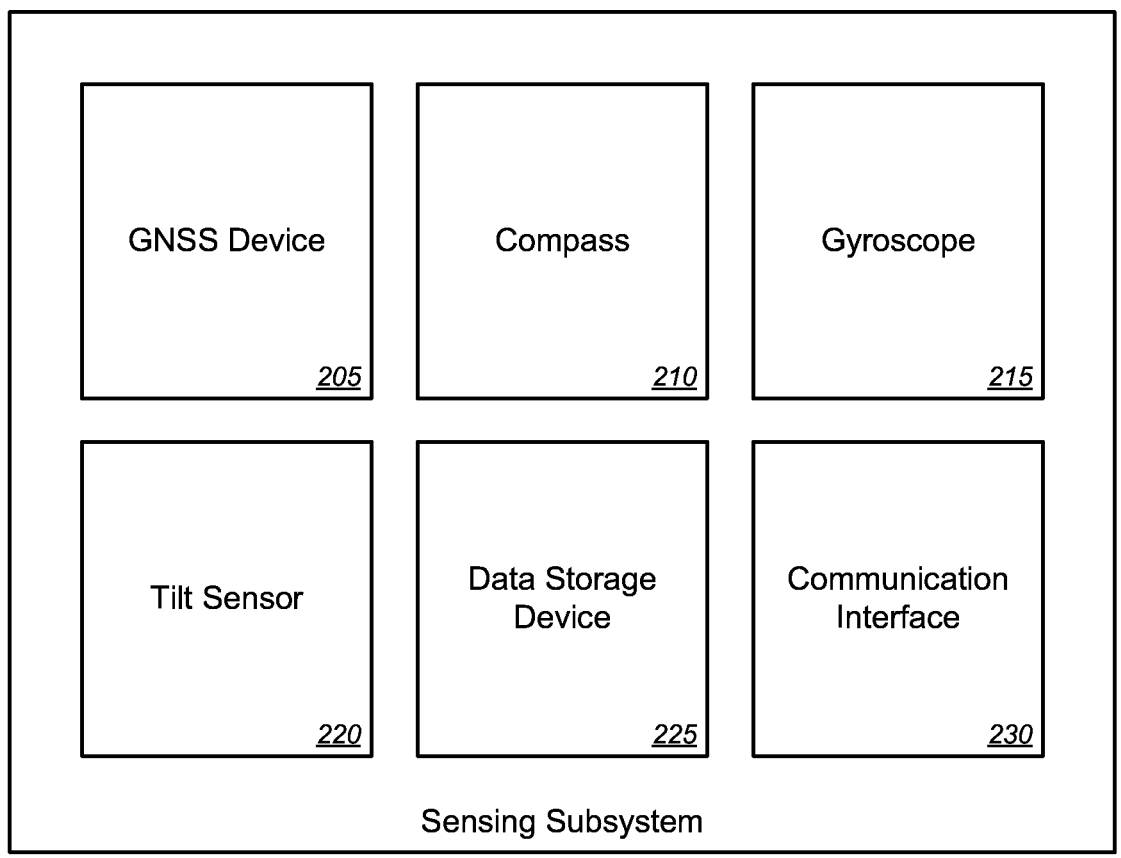
FIG. 2 is a functional block diagram illustrating a sensing subsystem for a position measurement system, in accordance with various embodiments.

In certain aspects, the sensing subsystem 115 comprises one or more of a variety of different types of sensors, which can be used to gather data (e.g., for position measurement purposes). Merely by way of example, FIG. 2 is a functional block diagram illustrating the sensing subsystem 115 of FIG. 1 in further detail, in accordance with to certain embodiments. The various components of the sensing subsystem 115 may be incorporated within a single housing that encloses the entirety of the sensing subsystem 115; alternatively, the sensing subsystem 115 might comprise a plurality of components divided between two or more discrete housings. Similarly, certain structural components of the sensing subsystem 115 may be relatively more integrated and/or separated. Thus, the sensing subsystem 115 depicted by FIG. 2 should be considered a set of functional components, which may or may not correspond to individual structures.

As illustrated in FIG. 2, the sensing subsystem 115 comprises a GNSS device 205, which can be used to obtain a set of GNSS data, such as data identifying a position of the GNSS device 205 (and/or, more generally, the sensing subsystem 115 and/or the rover 100). In one aspect, the GNSS device 205 might comprise a GNSS receiver, an antenna, and/or any other necessary equipment, which may (but need not necessarily) operate in a conventional manner to receive and process signals from a navigation satellite constellation to determine the current position of the GNSS device 205. Additionally and/or alternatively, the GNSS device 205 might employ any of a variety of advanced satellite navigation techniques. Merely by way of example, in some cases the GNSS device 205 may be configured to employ real-time kinematics ("RTK") techniques, perhaps in conjunction with a base station that broadcasts a GNSS correction signal for reception by one or more rovers (and/or other GNSS devices), as is known in the art.

In one aspect, the GNSS device 205 can be used to determine an orientation (e.g. relative to a standard compass coordinate system of North, South, East, and West) of the rover 100. As used herein, the term "orientation" means any disposition of the rover that can be determined (in one, two, or three dimensions) as an angle from a reference point (or reference direction, such as magnetic North, true North, etc.). Merely by way of example, in some embodiments, the GNSS device 205 (and/or a receiver and/or antenna thereof) might be extended away from the longitudinal axis of the rod 105, the rover 100 can be rotated about its longitudinal axis, which effectively rotates the GNSS device 205 (and/or the receiver/antenna) in an arc. Multiple sets of GNSS data can be obtained throughout the duration of this rotation, and from these multiple GNSS fixes the orientation of the rover 100 can be determined. Other techniques can be used to orient the rover 100 as well.

In some embodiments, the sensing subsystem 115 further includes a compass 210, which can be used to obtain compass orientation data, e.g., based on measurement of the Earth's magnetic field in the conventional manner. As described in further detail below, this compass orientation data can be used to calculate an azimuth to a target point. In some embodiments, a compass might not be accurate enough to be used for determining the azimuth to a target point. In such cases, the compass can be used to calculate the azimuth of the tilt direction of a tilted rod and/or to give a coarse orientation of the images with respect to North.

In other embodiments, the sensing subsystem 115 might comprise a gyroscope 215. Any of a variety of different types of gyroscopes may be used in accordance with different embodiments. Merely by way of example, in some cases the sensing subsystem 115 may comprise a mechanical gyroscope, while in other cases and electronic and/or MEMS-based microscope may be employed instead. Those skilled in the art will appreciate, based on the disclosure herein, that any of a variety of different types of known gyroscopes may be used in accordance with different embodiments. The gyroscope 215 can be used to obtain gyroscopic data about a relative orientation of the position measurement system, which, in turn, can be used inter alia to correct azimuths derived from other data (for example, an error in a compass azimuth caused by magnetic interference, etc.) As described in further detail below, backsighting to known points (using imagery, a coarse sighting telescope, etc.) can be used to obtain precise azimuth data on the orientation of the rover 100.

In some cases, the sensing subsystem 115 may include one or more tilt sensors 220, which generally can be used to determine the angle (e.g. in two dimensions from vertical) of the rod 105. A variety of different types of tilt sensors, including without limitation accelerometers, may be included in accordance with different embodiments. In some cases, the tilt sensor will be accurate to within at least 1°, while in other cases the tilt sensor may be accurate to within at least 0.1°. Merely by way of example, a set of embodiments may use one or more of the following tilt sensors: the SCA103T differential inclinometer, available from VTI Technologies Oy; the ADXL16209 dual-axis accelerometer, available from Analog Devices, Inc.; and the ADIS16209 dual-axis digital inclinometer and accelerometer, also available from Analog Devices, Inc. Other variations are possible.

Those skilled in the art of surveying will appreciate that a measurement tool should be substantially vertical when measuring position data and/or when calculating azimuths. Conventionally, a two-dimensional level bubble has been used to perform this function. In accordance with certain embodiments, however, the tilt sensor 220 (and/or a compass or other azimuth determination device) can be used to determine (and/or, in some cases, correct for) situations in which the rover 100 is not in a substantially vertical position when measurements are to be performed. Merely by way of example, as described in further detail below, input from the tilt sensor 220 can be used to inform the display of an electronic "bubble" for an operator, and/or can be used to adjust calculated positions and/or azimuths (at least within certain tolerances).

In addition to the sensors, the sensing subsystem 115 might also include supporting electronics. Merely by way of example, in many cases the sensing subsystem 115 may include a power supply (e.g., a rechargeable battery, and input line from an external power source, and/or the like), which is not illustrated on FIG. 2. The sensing subsystem 115 might also comprise a data storage device 225, which can be any device capable of storing data, either relatively temporarily (such as dynamic RAM) and/or relatively permanently (such as any of the computer readable media described in further detail below). The data storage device 225 can be used, inter alia, to store data collected by any or all of the sensors within the sensing subsystem 115.

The sensing subsystem 115 may also include a communication interface 230, which may comprise any necessary hardware and/or software for communicating with other components of the rover 100 (and/or external devices, such as the RTK base station described above). Thus, for example, the communication interface 230 might include a UHF radio, cellular radio, and/or other relatively long-range communication facilities. Additionally and/or alternatively, the communication interference 230 might include relatively short-range medication facilities, such as a Bluetooth transceiver, a WiFi transceiver, a wired communication interface (such as an Ethernet port, a USB interface, and/or the like), etc. Those skilled in the art will appreciate that a variety of different types of communication techniques can be used, depending on bandwidth requirements, range requirements, cost requirements, and so forth.

Figure 6:
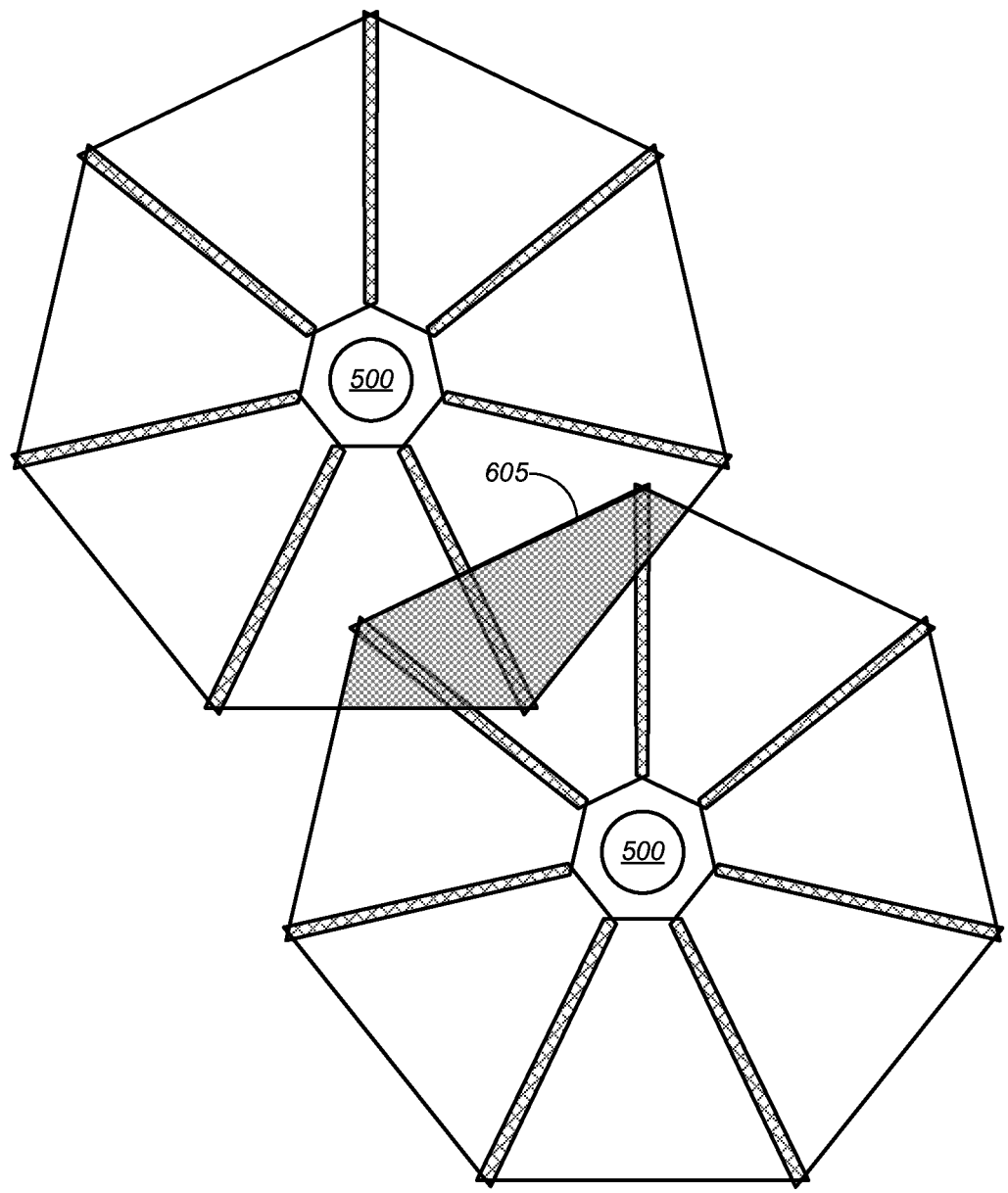
FIG. 6 illustrates overlapping fields of view of a panoramic image capture system at two stations, in accordance with various embodiments.
Figure 7:
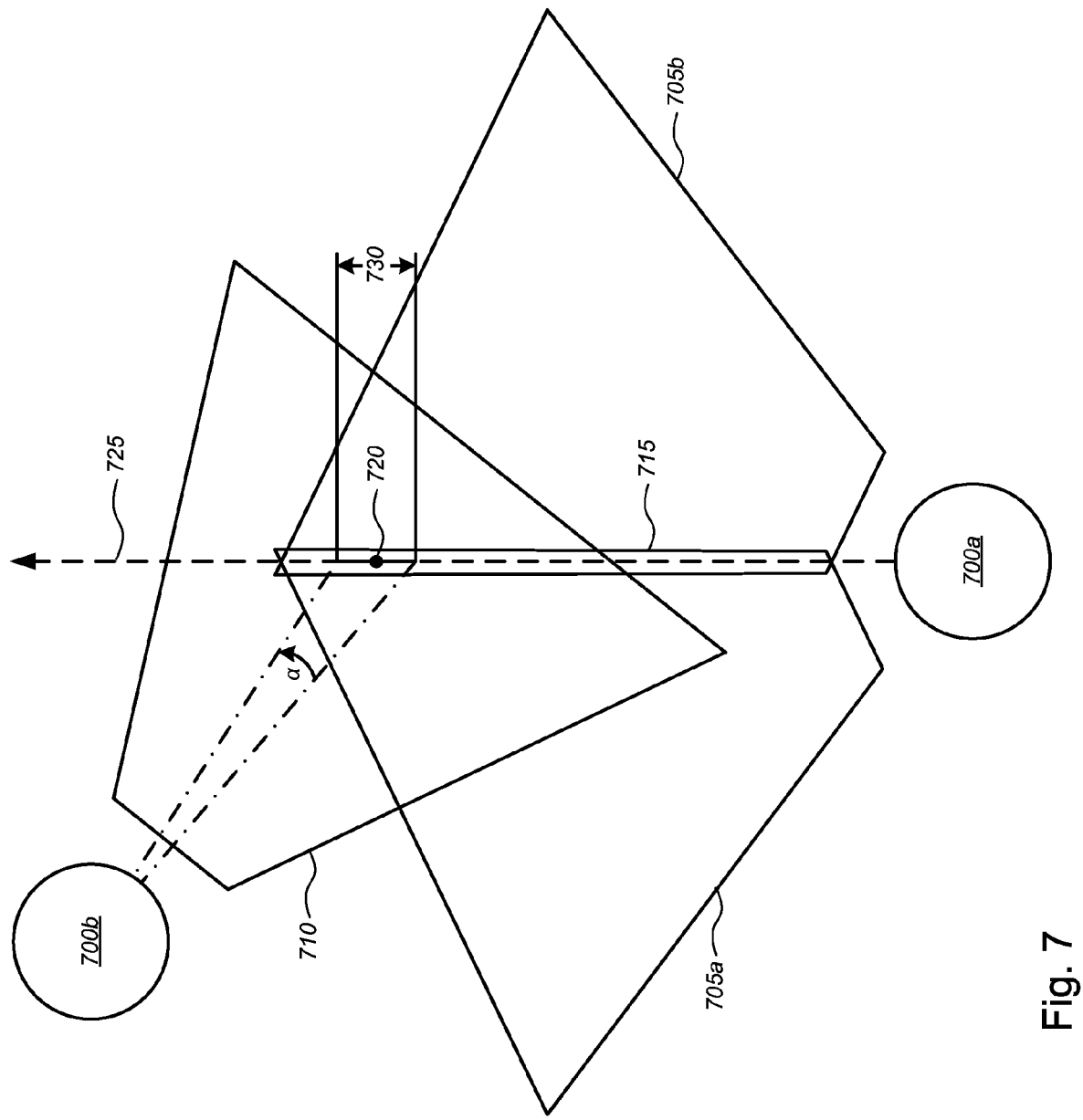
FIG. 7 illustrates a technique for identifying a search area using an intra-overlap.

Returning to FIG. 1, the rover 100 can also comprise a control subsystem 120. The control subsystem 120 might comprise any device or combination of devices that can function to control and/or receive input from the other subsystems (e.g., the sensing subsystem 115, the image capture subsystem 130 described below, etc.). Thus, in one aspect, the control subsystem might comprise a special-purpose computing device, such as any of the field computers commercially available from Trimble Navigation Ltd., to name several examples. In another aspect, the control subsystem 120 might comprise a general purpose-computing system (e.g., a laptop computer, tablet computer, handheld computer or smartphone/PDA, etc.) programmed with software (e.g., a set of instructions) to perform methods for controlling the rover 100 (and/or its various subsystems) and/or for processing input received from the rover's subsystems. FIGS. 6 and 7, described in detail below, illustrate several exemplary computing systems, some of which could be used as a control subsystem 120 for the rover 100, in accordance with different embodiments.

Various embodiments of the control subsystem 120 might comprise different features and/or functionality. Merely by way of example, in many cases, the control subsystem 120 will have a communication interface, which, like the communication interface of the sensing subsystem 115 described above, can feature any necessary hardware and/or software to support communication with the various subsystems and/or external devices. Such modes of communication may be short-range and/or long-range and may be wired, wireless, or both. In one aspect, the communication interface of the control subsystem 120 will comprise hardware and/or software that corresponds to the communication interface of the sensing subsystem 115 (and/or other subsystems), to allow for robust communication between the two subsystems. In another aspect, the control subsystem 120 might have a communication interface that supports longer-range communications (e.g., cellular or WWAN facilities), even if the other subsystems do not. The communication interface of the control subsystem 120 may be configured to allow communication with other special-purpose or general-purpose computers (both other control subsystems and other computers, such as an office computer) to allow information to be exchanged (e.g., uploaded, downloaded) between the control subsystem 120 and such other computers, for example, by local communications (e.g., Bluetooth, USB, etc.) and/or network communications (e.g., over the internet, a WWAN, a LAN, etc.).

In many embodiments, the control subsystem 120 will also include one or more input devices (e.g., one or more buttons, a keypad, keyboard, touchpad, mouse, etc.) and/or one or more output devices (e.g., display device, printer, etc.). In one aspect, a touchscreen might serve as both an input device and an output device for the control subsystem 120. The control subsystem 120 also will often include one or more processors and/or one or more computer readable storage media, each of which are described in detail below, for processing and storing, respectively, both software (e.g., executable instructions) and data (e.g., data received from the subsystems, data inferred or derived from subsystem input, etc.).

In an aspect, the control subsystem 120 comprises and/or provides a user interface (e.g., via the input and/or output devices). The user interface allows users to interact with the control subsystem 120 to control the operation of the subsystem 120 and/or of the rover 100 more generally. A variety of user interfaces may be provided in accordance with various embodiments, including without limitation graphical user interfaces that display, for a user, display screens for providing information to the user and/or receiving user input from a user.

In some cases, the user interface (and/or other functionality) of the control subsystem 120 might be provided (at least in part) remotely. Merely by way of example, in some embodiments, the control subsystem 120 may be configured to communicate (either relatively continuously or relatively sporadically) with a separate computer (described herein as an "office computer") e.g., via a dedicated application running on the office computer; in this situation, at least a portion of the user interface might be provided by the office computer, which could serve to communicate instructions to the control subsystem 120 and/or to receive data therefore. In this situation, providing the user interface might comprise providing instructions and/or data to cause or allow the office computer to display the user interface. Thus, when this document describes the functionality of the control subsystem 120, it should be understood that such operations could be performed locally (e.g., in the field) by the control subsystem 120, remotely (e.g., in an office) by the office computer, or in combined fashion (where each system provides some of the described functionality). In other embodiments, the user interface may be provided from a web site, e.g., by providing a set of one or more web pages, which might be displayed in a web browser running on the office computer and/or might be served by a web server.

A number of different physical configurations of the control subsystem 120 are possible. In one embodiment, for example, the control subsystem 120 might be permanently (or relatively permanently) mounted on the rod 105, e.g., using any of a number of available adhesive substances and/or mounting hardware. In another embodiment, the control subsystem (and/or a housing thereof), might be formed integrally with the body of the rod 105. In other embodiments, however, the control subsystem 120 might be only removably mounted on the rod 105 (e.g., using hook-and-loop fasteners, removable brackets, etc.) and/or might be physically separate from (and/or optionally tethered to) the rod 105.

In other embodiments, the rover 100 includes an image capture subsystem 125 (and thus can serve as an image capture system, as described herein). In general, the image capture subsystem 125 comprises any device, or set of devices, that is capable of capturing (still or moving) optical images. In some cases, the image capture subsystem 125 (and/or any individual image capture devices therein) will include any necessary hardware and/or software to store (at least temporarily) captured images, process captured images, and/or transmit captured images, either pre- or post-processing, to another device (such as a control subsystem 120) for storage, display, processing, etc. The image capture subsystem 125 may or may not have a display device for displaying captured images. Fundamentally, however, the image capture subsystem 125 need only have the necessary facilities for capturing optical images.

More specifically, the image capture subsystem 125 often comprises one or more image capture devices (e.g., digital cameras, image sensors, etc.) that collectively capture a panoramic image of at least a portion of the landscape surrounding the rover 100. A particular embodiment, for example, includes a plurality of cameras that collectively capture a larger radial field of view than a single, standard camera can accommodate. In some embodiments, the cameras (or image sensors) are positioned on the rover 100 with a known orientation relative one another, such that any two adjacent cameras have a pre-defined intra-overlap area, which can be used to facilitate the analysis performed by various embodiments.

Figure 3A:
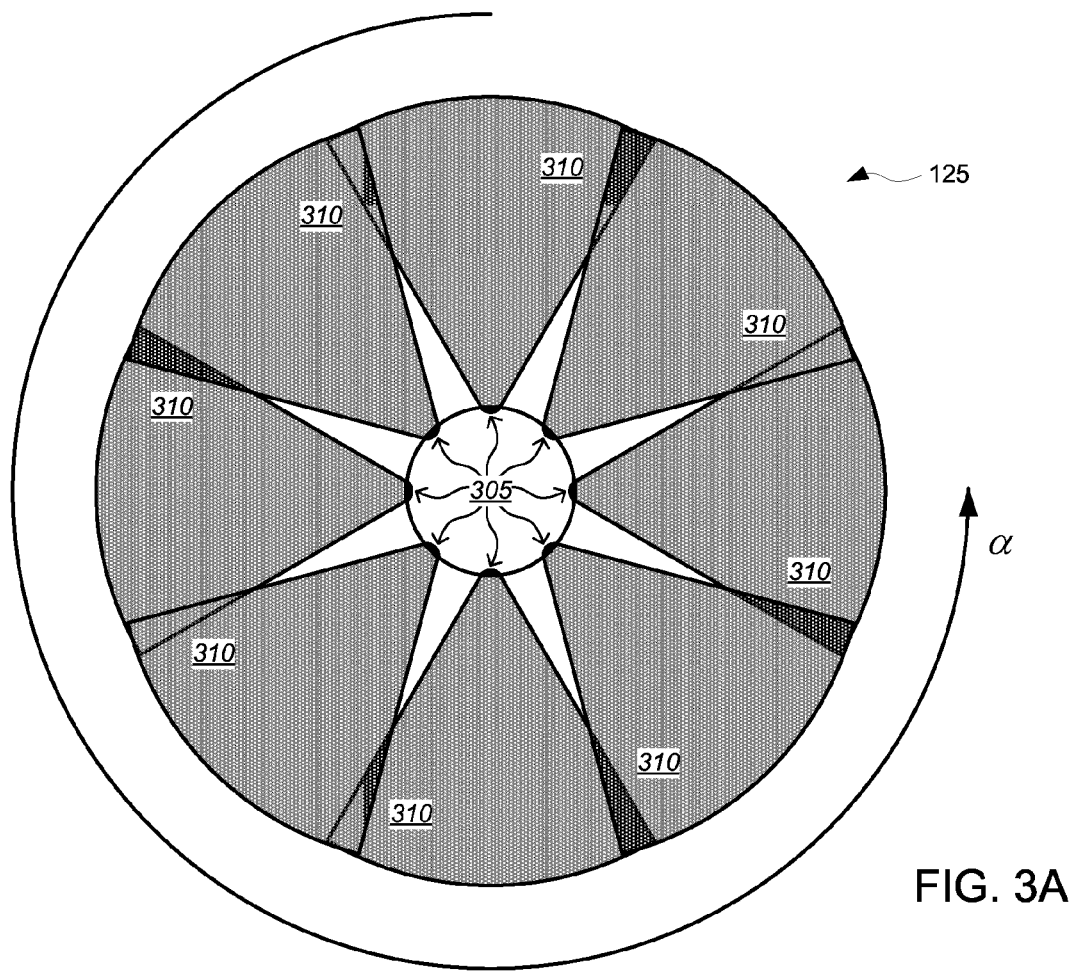
FIGS. 3A-3C illustrate a panoramic field of view of a position measurement system, in accordance with various embodiments.

To illustrate, FIG. 3A shows a plan view of an image capture subsystem (or "imaging subsystem") 125, which may be incorporated in a rover such as the rover 100 of FIG. 1. The image capture subsystem 125 of FIG. 3A includes eight image capture devices 305 each of which has a field of view 310, although different embodiments may use more or fewer image capture devices 305 (for example, one set of embodiments might comprise seven image capture devices). In some cases, the image capture subsystem 125 might include a flash device (such as an LED flash) for each image capture device 305; the flash might have the same field of view as the corresponding image capture device 305.

As can be seen from FIG. 3A, each image capture device 305 has a field of view 310 that overlaps with the fields of view 310 of the adjoining image capture devices 305. Collectively, image capture devices cover a panoramic (radial) field of view defined by the angle $\alpha$, which in the illustrated case, is 360°. Thus, in the illustrated embodiment, the image capture subsystem 125 can capture a panoramic image that includes the entire visible landscape (at least outside of a minimum radius). One skilled in the art will appreciate that known techniques exist to generate a composite image from each of the individual images captured by each image capture device, thus providing a single image comprising the collective field of view of the entire set of image capture devices 305.

As can be seen from FIG. 3A, however, inside a certain radius, the fields of view of the image capture devices 305 do not overlap, resulting in a gap in the coverage provided by image capture devices 305. Accordingly, in some embodiments, the image capture subsystem 125 may include two sets of cameras, e.g., one set disposed with a field of view that extends generally laterally from image capture system 125, and another set (which may be disposed with a field of view below the horizontal) configured to obtain images within that minimum radius, inside of which the fields of view of the first set of image capture devices do not overlap. Moreover, the second set of image capture devices can capture points of interest and/or tie points that are sufficiently close to the rover that they fall outside the field of view of the first set of image capture devices; similarly, the second set of image capture devices can document the area in the immediate vicinity of the rover.

Figure 3B:
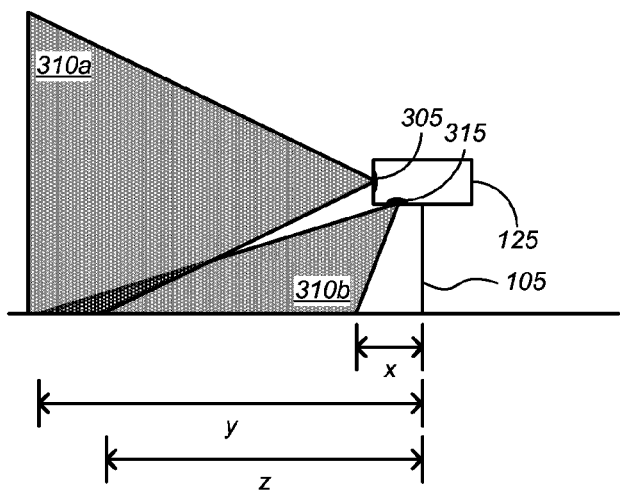

To illustrate, FIG. 3B illustrates an elevation view of the rover, including the rod 105 in the image capture subsystem 125. In the illustrated embodiment, the image capture subsystem includes a first image capture device 305, with a generally horizontal field of view 310a, and a second image capture device 315 that has a field of view 310b. Extending horizontally from the base of the rod 105, the field of view 310b of the second image capture device 315 has a minimum distance x and a maximum distance y at which an image of the ground can be captured, while the field of view 310a of the first image capture device 305 has a minimum distance z at which the field of view meets the ground. The two image capture devices 305, 315 are configured so that the fields of you overlap (i.e., the distance z is less than the distance y), which allows a composite field of view from minimum distance x to the maximum focal range of the first image capture device 305, which generally is limited only by the resolution of that device. As can be seen from FIG. 3C, which is a plan view of FIG. 3B, the field of view 310b may also have a greater radial field of view (at a given radius from the device) than the corresponding field of view 310a of the first image capture device.

Figure 3C:
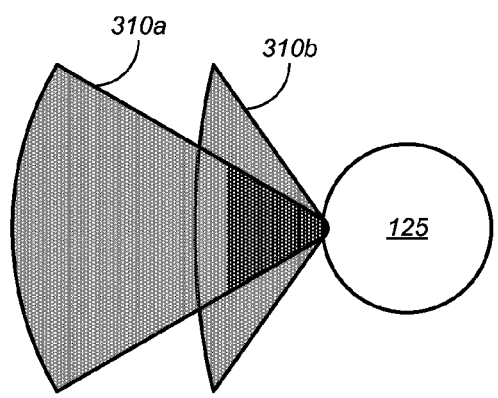

It should be realized, of course, that for ease of illustration, FIGS. 3B and 3C depict two sets of image capture devices comprising only one image capture device each, denoted 305, 315, respectively, this principle can be applied to the embodiment depicted in FIG. 3A, resulting in two sets of image capture devices, each having a plurality of cameras. Merely by way of example, in one embodiment, the first set of cameras might comprise seven cameras 305 having a collective panoramic field of view α of approximately (or precisely) 360° and field of view of the ground that extends from a minimum radius (z) of approximately 5 meters, while the second set of cameras might comprise five cameras 315 having a collective panoramic field of view α of approximately 180° (or, in some cases, more than 180°, such as approximately 200°), a field of view of the ground that extends from a minimum radius (x) of approximately 0.6 meters to a maximum radius (y) of approximately 6 meters.

Other configurations are possible as well. Merely by way of example, in some cases, an image capture subsystem 125 might comprise one or more cameras (or other image capture devices) having a collective panoramic field of view of at least about 50°, of at least about 170°, and/or of at least about 350°. There might be one set of cameras, two sets of cameras, or more. In an exemplary configuration, a first set of image capture devices might be equally spaced in radial fashion around the circumference of the rod, and a second set of cameras might be equally spaced in radial fashion around half of the circumference (or the entire circumference) of the rod.

Many different types of image capture devices may be employed by the image capture subsystem 125. Those skilled in the art will appreciate that the characteristics of a selected image capture device often will affect the qualities of captured images, and image capture devices therefore may be chosen in accordance with the needs of particular implementations. As described in further detail below, the image capture subsystem 125 may be used for a variety of purposes, including without limitation, target point selection, photogrammetric analysis, and others. Accordingly, the type and nature of the image capture device(s) may vary by implementation.

In one embodiment, for example, the OV5462 5 megapixel CMOS image sensor, commercially available from OmniVision Technologies, may be used as an image capture device. This may be coupled with optics, such as an f=3.5 mm lens. In other cases, one or more commercially available digital cameras (e.g., consumer, "prosumer" or professional-grade cameras) may be employed as image capture devices.

Returning again to FIG. 1, the rover 100 might also include an optical target such as a prism 130. The prism 130 can allow the rover 100 to function, inter alia, as an optical target for another rover, total station, etc. In one aspect, the prism 130 can comprise any device, or plurality of devices, that can have properties (e.g., reflectivity) that facilitate the (e.g., electronic and/or optical) acquisition of the prism 130 by another position measurement device.

The rover 100 might also include a distance measurement subsystem 135. The distance measurement subsystem 135 can comprise any device(s) that is/are capable of measuring, inferring, or otherwise determining a distance from the rover 100 to a target point, and/or a distance between two target points. Merely by way of example, in one embodiment, the distance measurement subsystem might be an electronic distance measurement ("EDM") subsystem comprising an EDM device, which might be, for example, a laser emitter/receiver combination that is configured to emit laser light and received light reflected from an optical target at the target point.

In a novel aspect of some embodiments, the distance measurement subsystem 135 is configured to have the ability to perform distance measurements not only in a horizontal (or roughly horizontal) plane, but also at relatively extreme angles from the horizontal. This can enable the rover 100, for example, to measure distances above the rover 100 (e.g., to a ceiling, top of a building, etc.) and/or measure distances below the rover 100 (e.g., down a manhole, etc.) while still maintaining the rover 100 with the longitudinal axis perpendicular (or generally perpendicular) to the ground surface. One technique employed by certain embodiments for accomplishing this functionality is to provide a mechanism by which the distance measurement subsystem 135 can be rotated in a vertical plane (e.g., along an axis perpendicular to the longitudinal axis of the rover 100). In another aspect, the distance measurement subsystem 135 might be disposed with an aperture eccentric to longitudinal axis of the rod 105. As such, the distance measurement subsystem 135 can be rotated to aim upward or downward (as far as vertical, in some cases), while the longitudinal axis of the rod 105 is maintained in a substantially vertical position. (Of course, in other embodiments, the aperture of the distance measurement subsystem 135 might be aligned with the axis of the rod 105.)

FIG. 4 provides a schematic illustration of one embodiment of a computer system 400 that can perform the methods provided by various other embodiments, as described herein, and/or can function as an office computer, a control subsystem for a rover, and/or the like. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

Exemplary Image Analysis Techniques

As noted above, various embodiments can provide techniques (embodied as systems, methods, software, etc.) for identifying conjugate points, performing bundle adjustments, and/or performing other image analysis, and in a particular aspect, such techniques can take advantage of image characteristics described herein as "intra-overlap" and "inter-overlap." FIGS. 5 and 6 illustrate these characteristics.

FIG. 5 illustrates (from overhead) an image capture system 500 that provides panoramic coverage using seven cameras (not show in FIG. 5). Each camera has a field of view 505. These fields of view overlap in intra-overlap areas 510, which are shaded on FIG. 5 for ease of identification. Each intra-overlap area will be contained in images taken by two adjacent cameras; for example, the intra-overlap area 510a can be found in images captured by cameras with fields of view 505a and 505b. FIG. 6 illustrates (from overhead) the image capture system 500 of FIG. 5 at two stations (This arrangement can represent the same image capture system, which is moved from station to station, or it can represent two different image capture systems at different stations.) As can be seen from FIG. 6, the panoramic fields of view of the system 500 when at different stations overlap in an area 605 referred to herein as an "inter-overlap" area.

These relationships can be used, in accordance with various embodiments, to provide more efficient image analysis by reducing the search area required for bundle adjustment. For example, FIG. 7 illustrates one example of such a technique. FIG. 7 illustrates an image capture system positioned at two stations (illustrated by the image capture system 700a at the first station and the image capture system 700b at the second station, respectively). As noted above, this arrangement can be implemented as the same image capture system sequentially positioned at two different stations or two different image capture systems simultaneously or sequentially positioned at the different stations). In an aspect, the image capture system can comprise multiple cameras (e.g., as described above) providing a panoramic field of view of up to 360°. For ease of illustration, however, FIG. 7 illustrates only a partial field of view from each station, including a two-camera field of view for the system 700a at the first station (illustrated as a field of view 705a from a first camera and a field of view 705b of a second camera) and a single camera's field of view 710 from the system 700b at the second station.

As illustrated, the two fields of view 705 from cameras at the first station overlap in an intra-overlap area 715. For an identified target point 720 found within that intra-overlap 715, an azimuth 725 can be determined, based on the orientation of the system 700a at the first station. Moreover, given the known relative orientation of the cameras having the respective fields of view 705a, 705b, the distance to the target point can be estimated using photogrammetric techniques. The position of the target point 720 can be intersected from the point stereo pair in fields of view 705a, 705b. Because of the short baseline distance between the two cameras, this distance estimate generally will be a range 730 (the magnitude of which is dependent on the baseline between the cameras). More specifically, the baseline is the translation between the centers of projection of two adjacent cameras. In many embodiments, that baseline will be about 5 cm or less. The target point 720 is observed twice (once in field of view in 705a and once in field of view 705b. Two vectors, which point to the target point 720 from each respective camera's center of projection, are generated from the conjugate points in the intra-overlap, and these two vectors intersect at point 720.

Given this azimuth 725 and estimated distance range 730, the disclosed technique can identify the field of view 710 (of the system 700b at the second station) in which the target point will be found, because the position and orientation of the system 700a, 700b at each station, respectively, is known (using techniques described above and in the Incorporated Applications), and an image captured by the system 700b corresponding to this field of view 710 can be identified based on this identified field of view 710.

Further, the estimated distance range 730 can be used to identify a search range (illustrated by the angle $\alpha$ on FIG. 7) corresponding to the projection of the estimated distance range 730 on the image captured by the camera with the field of view 710 that includes the target point 720. In this way, the technique can be used not only to identify which, of several, images taken by cameras on the image capture system 700b at the second station should be searched for the target point, but also to identify a search range within that image, which can make conjugate point identification much more efficient (e.g., by reducing processing time) and/or accurate (e.g., by reducing the possibility of incorrect matches), as described above.

Figure 8:
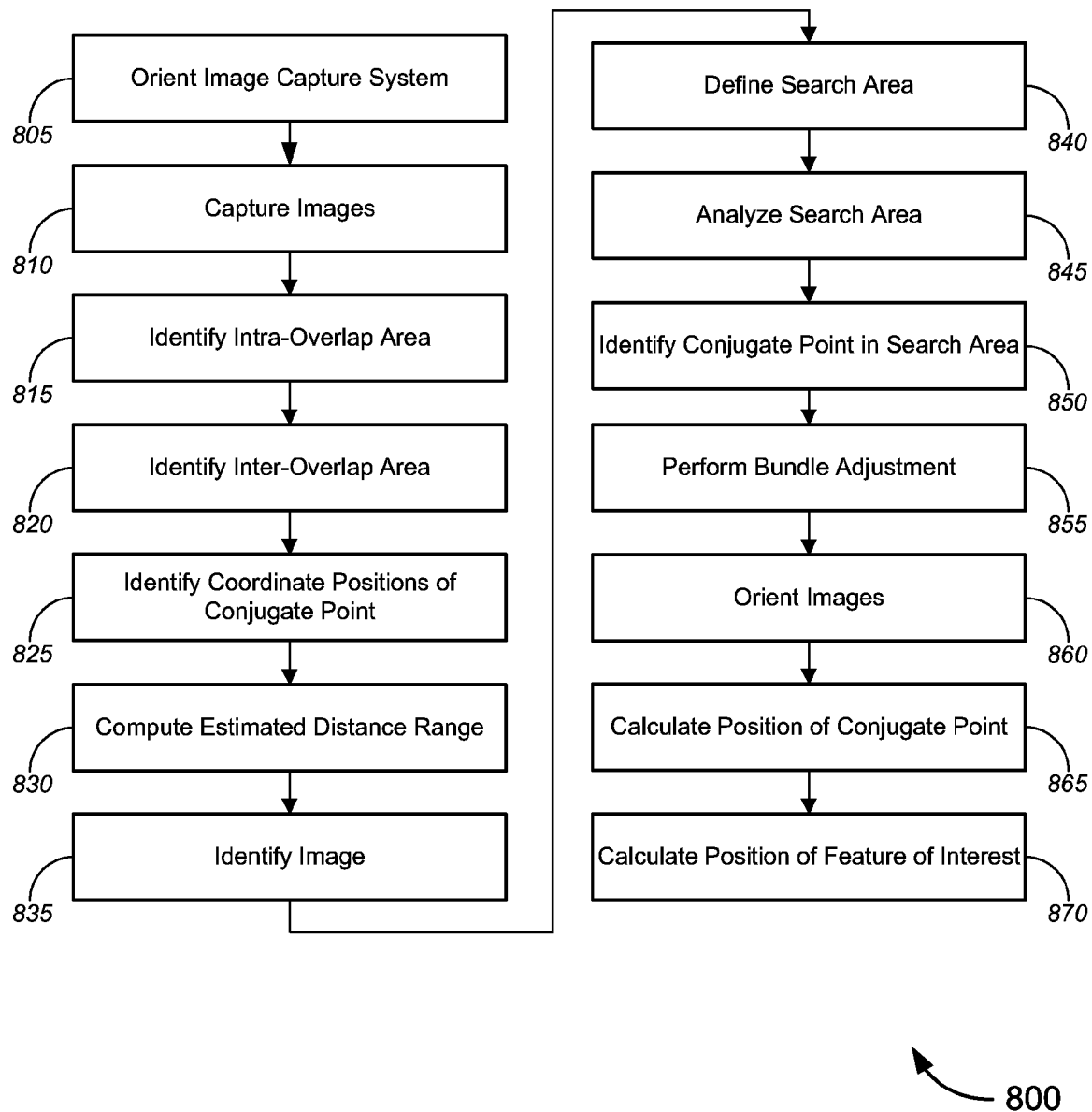
FIG. 8 is a process flow diagram illustrating a method of image analysis, in accordance with various embodiments.

FIG. 8 illustrates a method 800 of image analysis, in accordance with various embodiments. While the method 800 of FIG. 8 is illustrated, for ease of description, as a single method, it should be appreciated that the various techniques and procedures of this method can be combined in any suitable fashion to provide a variety of methods according to different embodiments. Similarly, while the techniques and procedures of the method 800 are depicted and/or described in a certain order for purposes of illustration, it should be appreciated that certain procedures may be reordered and/or omitted within the scope of various embodiments. Moreover, while the method 800 (and the procedures thereof) can be implemented by (and, in some cases, are described below with respect to) the systems described with respect to FIGS. 1-7 (or components thereof), these methods may also be implemented using any suitable hardware implementation. Similarly, while the system described with respect to FIGS. 1-7 (and/or components thereof) can operate according to the method 800 (e.g., by executing instructions embodied on a computer readable medium), the systems can also operate according to other modes of operation and/or perform other suitable procedures.

In some embodiments, the method 800 comprises orienting an image capture system at a station (block 805) and capturing one or more images with the image capture system at that station (block 810). As noted above, there are several techniques that can be used to orient (i.e., determine the orientation of) an image capture system, and any such techniques can be used in accordance with the method 800. Similarly, the image capture system can include a variety of different types of cameras and other equipment, and any such equipment can be used to capture images, so long as those images can be oriented. Merely by way of example, as noted above, in some cases an image capture system might comprise a plurality of panoramic image sensors, and method might comprise capturing images with two (or more) adjacent image sensors from one station, then moving the system to another station and capturing images with one (or more sensors) from the second station. In other cases, the image capture system might comprise an aerial camera, and one or more of the captured images might be aerial images.

The method 800 can further comprise identifying an intra-overlap area in two images (block 815); in an aspect, this intra-overlap area might have a common field of view in the first and second images. For example, by reference to FIG. 7, the method might comprise capturing an image with a camera having a field of view 705a and capturing an image with a camera having a field of view 705b, both while the image capture system is at a first station. As noted above, the system can be calibrated so that the first camera has a know translation and orientation relative to the second camera. In such cases, the intra-overlap area can be identified (and will constitute the same relative portions of respective images captured by those two cameras at any station). For example, the image capture system might be configured so that the intra-overlap is between about 1 percent of each image and about 50 percent of each image. (The proportion of each image that is part of the intra-overlap does not have to be the same in both images, although it often will be if the same type of camera is used to collect both images.) More specifically, in certain embodiments, the intra-overlap might be between about 5 percent of each of the fields of view and about 20 percent of each of the fields of view, and/or between about 8 percent of each of the fields of view and about 12 percent of each of the fields of view. In other cases, there might be no specified translation and/or orientation between the two cameras, and other techniques can be used to identify the intra-overlap area (e.g., by calculating the relative orientation of each camera when the images are taken, etc.).

Similarly, in an aspect, the method 800 might further comprise identifying an inter-overlap area in three or more images (block 820); in an aspect, the inter-overlap area can have a common field of view in each of the images. In a particular aspect, the inter-overlap area will include a common field of view in images captured from multiple stations. For instance, in a particular embodiment, as illustrated by FIG. 6, an image capture system might capture a plurality of images from a first station and a plurality of images from a second station. The inter-overlap area, in an aspect, will be an area that can be found in at least one of the images captured from the first station and at least one of the images image captured from the second station; in another aspect, the inter-overlap might include at least a portion of the intra-overlap of two of the images captured from the first station.

The method 800, in some embodiments, further comprises, at block 825, identifying coordinate locations of a conjugate point in two of the images (e.g., two stereo images, such as two images taken by adjacent cameras of an image capture system at a first station). In an aspect, the conjugate point can be any point that is identifiable in both of the images; such a point can be a natural or manmade feature captured in each image; in some cases, the conjugate point might be an optical target placed in the field of view of the cameras capturing the images. Conventional image analysis and/or photogrammetric techniques can be used to identify the coordinate location of the conjugate point in each image. Further, if the intra-overlap area has been identified, the analysis of the images to identify the conjugate point can be limited to analysis of the intra-overlap area.

At block 830, the method 800 can comprise computing an estimated distance range from a center of projection of one or more of the cameras (e.g., one or more cameras that captured the images at the first station) to the conjugate point. This calculation can be based, in some aspects, on the coordinate location of the conjugate point in the captured images. Merely by way of example, when the relative orientations of two cameras are known (e.g., when the cameras are part of an imaging system and are fixed in know relative positions and translations), a line from the center of projection of a camera through the coordinate location of the conjugate point in the image captured by that camera can be calculated. The intersection of two or more such lines from different cameras can be used to estimate the distance of the conjugate point from the center of projection of one (or both) of the cameras. As noted above, in a typical image capture system, the baseline between these two cameras will be short (e.g., a few inches in many cases), so that precise determination of the distance is difficult; even in such cases, however, a relatively narrow distance range (e.g., in some cases, five meters or less, depending the accuracy of the matching algorithms) can be estimated.

In some embodiments, the method 800 comprises identifying a third image (e.g., an image from among a plurality of images taken from one or more other stations) in which the conjugate point can be found (block 835). The appropriate image can be identified from the estimated distance range, and the azimuth from the first station to the conjugate point (which can be determined based on the orientation of the image capture system and the coordinate position of the conjugate point in one or more image), the orientation of the second station, and/or the relative positions of the two stations. For example, referring again to FIG. 7, the image having a field of view 710 can be identified as the appropriate image to search for the conjugate point, based on the relative positions and/or orientations of the stations 700a and 700b, the azimuth 725 to the conjugate point 720, and the estimated distance range 730 to the point 720. As illustrated, the combination of these factors indicates that the point will be found in an image taken from a camera having field of view 710, rather than one of the other cameras (not shown) on the image capture system at the station 700b.

The method 800 can further comprise defining a search area in the third image (block 840). The search area, in one aspect, can be defined based on the computed estimated distance range from the first station to the conjugate point, the azimuth from the first station to the conjugate point, and/or the relative positions and/or orientations of the image capture system(s) at the first and second stations. Merely by way of example, referring again to FIG. 7, the search area for the conjugate point 720 in the image captured by the camera having field of view 710 can be defined as a strip of the image corresponding to the angle α, which represents the projection of the estimated distance range 730 on the field of view 710 of the camera at the second station 700b. In one aspect, then, the defined search area in the image might be the portion of the image (measured horizontally) that is defined by this angle α and the entire vertical resolution of the image. Hence, the search area can be considered to be a vertical strip of the image that corresponds to a projection of the estimated distance range from the first station on the field of view of the camera at the second station (or the image taken from that camera).

In another aspect, if at least one of the images taken from the first station is oriented (e.g., the position and angular orientation of the image capture device is known), a vertical dimension of the search area can be defined as well, and the vertical dimension can be narrowed from the entire vertical resolution of the image to some subset of that area. For example, using the estimated distance range and the height of the coordinate location in the image, an estimated elevation range can be identified; this estimated elevation range can be used to establish a vertical dimension of the search area in the third image by restricting the search area to the same estimated elevation range.

In accordance with some embodiments, the method 800 can include analyzing the defined search area (block 845) to identify a coordinate location, in the third image (e.g., an image taken from another station), of the conjugate point (block 850). In one aspect, analysis of the third image is limited to analysis only of the search area, which can substantially reduce the number of pixels that are analyzed in the third image. As noted above, conventional image analysis techniques can be used to identify this coordinate location in the third image; however, a key benefit of certain embodiments is that the use of such analysis can be limited to the defined search area, rather than the entire image. This limitation not only can increase processing speed dramatically, but it can also enhance accuracy of the analysis, because limitation of the search area reduces the possibility of the analysis producing false positives when identifying conjugate points (since any candidate points outside the defined search area would not even be considered as a possible conjugate).

At block 855, the method 800 can including performing a bundle adjustment calculation on the three images, e.g., using conventional techniques. From this bundle adjustment calculation, the images can be oriented relative one another (block 860); for example, while the first and second images (both taken from the same station) might already be oriented relative one another, the method 800 can include orienting the third image (taken from another station) with either or both of the first two images. Additionally and/or alternatively, orienting the images can comprise orienting some or all of the images relative a local or global coordinate system.

The method 800, then, can include calculating the position of the conjugate point (block 865) in a local or global coordinate system, based on the coordinate location of that point in two or more of the oriented images. Similarly, the position(s) of any other features of interest (e.g., building corners, natural features, intersection boundaries, etc.) captured in two or more of the images can be calculated (block 870). Merely by way of example, once the three (or more) images have been oriented relative a coordinate system, the location of any point found in the images can be calculated, within that same coordinate system, using conventional photogrammetric analysis.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system, comprising:
   an image capture system comprising a plurality of image sensors, the image capture system configured to:
   when oriented at a first station, capture a first image with a first image sensor having a first center of projection;
   when oriented at the first station, capture a second image with a second image sensor having a second center of projection;
   when oriented at a second station, capture a third image with one of the plurality of image sensors having a third center of projection; and
   a computer, comprising a processor and a non-transitory computer readable medium having a set of instructions executable by the processor to cause the computer to perform one or more operations, the set of instructions comprising:
   instructions to determine an intra-overlap area in the first and second images, the intra-overlap area having a common field of view in the first and second images and being defined by an overlap between a field of view of the first sensor and a field of view of the second sensor;
   instructions to determine an inter-overlap area in the first, second, and third images, the inter-overlap area having a common field of view in the first, second, third images;
   instructions to identify a first coordinate location, in the first image, of a conjugate point captured in the intra-overlap area of the first and second images and in the inter-overlap area of the first, second, and third images;
   instructions to identify a second coordinate location, in the second image, of the conjugate point;
   instructions to compute an estimated distance range from the first station to the first conjugate point, based at least in part on the first and second coordinate locations, wherein the estimated distance range corresponds to a segment of the third image;
   instructions to define a search area in the third image, based at least in part on the computed estimated distance range and relative orientations of the image capture system at the first and second stations;
   instructions to analyze the search area to identify a third coordinate location, in the third image, of the conjugate point, wherein analysis of the third image is limited to analysis of the search area, and wherein limitation of the analysis substantially reduces a number of pixels in the third image analyzed by the computer; and instructions to perform a bundle adjustment calculation to orient the third image relative to at least one of the first and second images, based at least in part on the first, second, and third coordinate locations of the conjugate point.

2. A method, comprising:

identifying, with a computer, a first coordinate location, in a first image captured, at a first station, by a first image sensor of an image capture system comprising a plurality of image sensors, of a conjugate point;

identifying, with the computer, a second coordinate location, in a second image captured, at the first station, by a second sensor of the image capture system, of the conjugate point;

computing, with the computer, an estimated distance range from a center of projection of at least one of the first and second images to the conjugate point, based at least in part on the first and second coordinate locations, wherein the first sensor has a first field of view when at the first station and the second image sensor has a second field of view when at the first station, and wherein the conjugate point is within an intra-overlap defined by an overlap between the first field of view and the second field of view, and wherein the overlap between the first field of view and the second field of view is between about 1 percent of each of the fields of view and about 50 percent of each of the fields of view;

defining, with the computer, a search area in a third image captured, at a second station, by one of the plurality of sensors of the image capture system, based at least in part on the computed estimated distance range and relative orientations of the image capture system at the first and second stations; and analyzing the search area, with the computer, to identify a third coordinate location, in the third image, of the conjugate point.

3. The method of claim 2, further comprising:

orienting the image capture system at the first station;

capturing the first image at the first station with the first image sensor;

capturing the second image at the first station with the second image sensor;

orienting the image capture system at the second station; and capturing the third image at the second station with the one of the plurality of image sensors.

4. The method of claim 2, further comprising:

identifying, based at least in part on the computed estimated distance range and relative orientations of the image capture system at the first and second stations, the third image from among a plurality of images captured at the second station.

5. The method of claim 2, wherein the plurality of image sensors are affixed radially around a central axis of the image capture system and are configured to capture a plurality of images when oriented at the first station, the plurality of images comprising the first image and the second image and collectively providing a panoramic mosaic of 360 degrees around the image capture system.

6. The method of claim 2, wherein the first image sensor is adjacent the second image sensor within the plurality of image sensors.

7. The method of claim 2, wherein the image capture system is calibrated such that the first image sensor has a known translation and orientation relative to the second image sensor.

8. The method of claim 2, wherein the overlap between the first field of view and the second field of view is between about 5 percent of each of the fields of view and about 20 percent of each of the fields of view.

9. The method of claim 2, wherein the overlap between the first field of view and the second field of view is between about 8 percent of each of the fields of view and about 12 percent of each of the fields of view.

10. The method of claim 2, wherein the computer is integrated with the image capture system.

11. The method of claim 2, wherein the computer is separate from the image capture system.

12. The method of claim 2, wherein the computer further comprises a communication interface configured to communicate with the image capture system.

13. The method of claim 2, wherein the communication interface provides wireless communication between the image capture system and the computer.

14. The method of claim 2, wherein the computed estimated distance range corresponds to a segment of the third image.

15. The method of claim 2, further comprising limiting analysis of the third image to analysis of the search area.

16. The method of claim 2, further comprising:

performing, with the computer, a bundle adjustment calculation to orient the third image relative to at least one of the first and second images, based at least in part on the first, second, and third coordinate locations of the conjugate point.

17. The method of claim 2, further comprising:

identifying, with the computer, an intra-overlap area in the first and second images, the intra-overlap area having a common field of view in the first and second images.

18. The method of claim 2, further comprising:

identifying, with the computer, an inter-overlap area in the first, second, and third images, the inter-overlap area having a common field of view in the first, second, third images.

19. The method of claim 2, further comprising:

orienting at least one of the images relative to a local or global coordinate system.

20. The method of claim 19, further comprising:

calculating a position, in the local or global coordinate system, of the conjugate point.

21. The method of claim 2, further comprising:

orienting at least one of the first and second images; and defining a vertical dimension of the search area based at least in part on the computed distance range and an orientation of at least one of the first and second images.

22. The method of claim 2, wherein at least one of the images is a panoramic image taken from an image capture system at ground level.

23. The method of claim 2, wherein at least one of the images is an aerial image.

24. An apparatus, comprising:

a non-transitory computer readable medium having encoded thereon a set of instructions executable by one or more computers to perform one or more operations, the set of instructions comprising:

instructions to identify a first coordinate location, in a first image captured, at a first station, by a first image sensor of an image capture system comprising a plurality of image sensors, of a conjugate point;

instructions to identify a second coordinate location, in a second image captured, at the first station, by a second sensor of the image capture system, of the conjugate point;

instructions to compute an estimated distance range from a center of projection of at least one of the first and second images to the first conjugate point, based at least in part on the first and second coordinate locations, wherein the first sensor has a first field of view when at the first station and the second image sensor has a second field of view when at the first station, and wherein the conjugate point is within an intra-overlap defined by an overlap between the first field of view and the second field of view;

instructions to define a search area in a third image captured, at a second station, by one of the plurality of sensors of the image capture system, based at least in part on the computed estimated distance range and relative orientations of the image capture system at the first and second stations; and instructions to analyze the search area to identify a third coordinate location, in the third image, of the conjugate point.

25. A computer system, comprising:

one or more processors; and a non-transitory computer readable medium in communication with the one or more processors, the computer readable medium having encoded thereon a set of instructions executable by the computer system to:

identify a first coordinate location, in a first image captured, at a first station, by a first image sensor of an image capture system comprising a plurality of image sensors, of a conjugate point;

identify a second coordinate location, in a second image captured, at the first station, by a second sensor of the image capture system, of the conjugate point;

compute an estimated distance range from a center of projection of at least one of the first and second images to the first conjugate point, based at least in part on the first and second coordinate locations, wherein the first sensor has a first field of view when at the first station and the second image sensor has a second field of view when at the first station, and wherein the conjugate point is within an intra-overlap defined by an overlap between the first field of view and the second field of view;

define a search area in a third image captured, at a second station, by one of the plurality of sensors of the image capture system, based at least in part on the computed estimated distance range and relative orientations of the image capture system at the first and second stations; and analyze the search area to identify a third coordinate location, in the third image, of the conjugate point.

* * * * *